US012045507B2

(12) United States Patent
Kobayashi et al.

(10) Patent No.: US 12,045,507 B2
(45) Date of Patent: Jul. 23, 2024

(54) STORAGE SYSTEM, DATA WRITE CONTROL METHOD, AND NON-TRANSITORY COMPUTER READABLE MEDIUM FOR STORING DATA WRITE CONTROL PROGRAM

(71) Applicant: Hitachi, Ltd., Tokyo (JP)

(72) Inventors: Yutaro Kobayashi, Tokyo (JP); Katsuya Tanaka, Tokyo (JP); Hideaki Fukuda, Tokyo (JP); Yoshikazu Murayama, Kanagawa (JP)

(73) Assignee: HITACHI, LTD., Tokyo (JP)

( * ) Notice: Subject to any disclaimer, the term of this patent is extended or adjusted under 35 U.S.C. 154(b) by 208 days.

(21) Appl. No.: 17/691,162

(22) Filed: Mar. 10, 2022

(65) Prior Publication Data

US 2023/0008395 A1   Jan. 12, 2023

(30) Foreign Application Priority Data

Jul. 9, 2021   (JP) ................................. 2021-114367

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0683* (2013.01); *G06F 13/1668* (2013.01)

(58) Field of Classification Search
CPC .... G06F 3/0659; G06F 3/0604; G06F 3/0683; G06F 13/1668
See application file for complete search history.

(56) References Cited

U.S. PATENT DOCUMENTS

| 9,996,498 | B2* | 6/2018 | Shahar ................ H04L 49/9068 |
| 11,086,780 | B1* | 8/2021 | Glimcher ............ G06F 11/2056 |
| 2020/0004463 | A1 | 1/2020 | Kobayashi et al. |

FOREIGN PATENT DOCUMENTS

JP           6649989 B2     2/2020

* cited by examiner

*Primary Examiner* — Idriss N Alrobaye
*Assistant Examiner* — Richard B Franklin
(74) *Attorney, Agent, or Firm* — MATTINGLY & MALUR, PC

(57) ABSTRACT

Each storage controller comprises a first storage unit, an interface unit, and a processing unit which sends, to the interface unit, a parameter which instructs n-fold write of writing data in each of n-number of (n is a natural number of 2 or more) other storage controllers. When the interface unit receives the parameter, the interface unit executes each processing of acquiring the data from the first storage unit and storing the data in the second storage unit, generating n-number of requests of writing the data in each of n-number of the other storage controllers, storing each of the generated requests in n-number of the queues corresponding to each of n-number of the other storage controllers, and processing each request stored in each queue and transferring the data stored in the second storage unit to each of n-number of the other storage controllers.

10 Claims, 13 Drawing Sheets

FIG. 4

| BUFFER# | BUFFER ADDRESS | STS RETURN DESTINATION CTL# | STS RETURN DESTINATION ADDRESS | QP1# | QP1 SSN | QP1 COMPLETION FLAG | QP1 STS | QP2# | QP2 SSN | QP2 COMPLETION FLAG | QP2 STS |
|---|---|---|---|---|---|---|---|---|---|---|---|
| 0 | 0x43210000 | 0 | 0x10000000 | 1 | 13 | 1 | OK | 2 | 15 | 1 | OK |
| 1 | 0x43211000 | 0 | 0x10003000 | 2 | 35 | 1 | OK | 5 | 18 | 0 | |
| 2 | 0x43212000 | - | - | - | | | | - | | | |
| 3 | 0x43213000 | 1 | 0x1000f000 | 4 | 62 | 0 | | 11 | 22 | 1 | NG (RETRANS-MISSION FAILURE) |
| ... | | | | | | | | | | | |

STORAGE SYSTEM, DATA WRITE CONTROL METHOD, AND NON-TRANSITORY COMPUTER READABLE MEDIUM FOR STORING DATA WRITE CONTROL PROGRAM

CROSS REFERENCES TO RELATED APPLICATION

This application claims priority based on Japanese patent applications, No. 2021-114367 filed on Jul. 9, 2021, the entire contents of which are incorporated herein by reference.

BACKGROUND

The present invention relates to a storage system, a data write control method, and a non-transitory computer readable medium for storing data write control program.

Conventionally, known is a multinode system in which a plurality of storages and a storage controller are connected so that, to a host, they appear to be one storage system. A multinode system is superior as a storage architecture in terms that the performance and capacity can be decided to match the needs of customers, and that the availability can be improved through multiplexing.

Here, in a multinode system, desired is a method of efficiently duplicating user data between storage controllers. For example, with the storage system disclosed in PTL 1, the first controller directly writes the write data, which was transferred from the host, in the data buffer of the switch interface of the second controller. Subsequently, the duplication of user data ("dual write" of user data to two controllers) is realized by the write data being written from the data buffer to the respective memories of the second and third controllers via DMA (Direct Memory Access).

CITATION LIST

Patent Literature

[PTL 1] Japanese Patent No. 6649989

SUMMARY

In the case of a multinode system which adopts RoCE (RDMA (Remote Direct Memory Access) over Converged Ethernet) when using Ethernet (registered trademark; hereinafter the same) as the connection between nodes, there are the following problems related to dual write.

In other words, when performing dual write, a controller of a transfer source needs to store a WR (Work Request) as a request of RDMA in a SQ (Send Queue), which is a send queue of a QP (Queue Pair) corresponding to each controller of a transfer destination. The WR stored in the SQ is referred to as a WQE (Work Queue Element). When the WQE stored in two SQs corresponding to the QP of each controller of the transfer destination is processed for the data transfer via DMA, access is executed twice between the interface of the multinode and the memory of the controller of the transfer source. Thus, the bandwidth between the processor and memory, and the interface of the multinode (for example, configured from an FPGA (Field Programmable Gate Array) or the like), in the controller of the transfer source is compressed, and may affect the storage system performance.

The present invention was devised in view of the foregoing problems, and an object of this invention is to reduce the consumed bandwidth between the controller's processor and memory and the communication interface in a storage system adopting RoCE for multinode communication.

In order to achieve the foregoing object, in one mode of the present invention, provided is a storage system configured by including a plurality of storage controllers, wherein each storage controller comprises: a first storage unit which stores data; an interface unit which functions as an interface when communicating with another storage controller; and a processing unit which sends, to the interface unit, a parameter which instructs n-fold write of writing the data in each of n-number of (n is a natural number of 2 or more) the other storage controllers, the interface unit comprises a second storage unit, and n-number of queues; when the interface unit receives the parameter, the interface unit executes each processing of: acquiring the data from the first storage unit and stores the data in the second storage unit; generating n-number of requests of writing the data in each of n-number of the other storage controllers; storing each of the generated requests in n-number of the queues corresponding to each of n-number of the other storage controllers; and processing each request stored in each queue and transferring the data stored in the second storage unit to each of n-number of the other storage controllers.

According to the present invention, for example, it is possible to reduce the consumed bandwidth between the controller's processor and memory and the communication interface in a storage system adopting RoCE for multinode communication.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF DRAWINGS

FIG. 4 is a diagram showing a configuration example of the management table according to the first embodiment.

DESCRIPTION OF EMBODIMENTS

Figure 1:
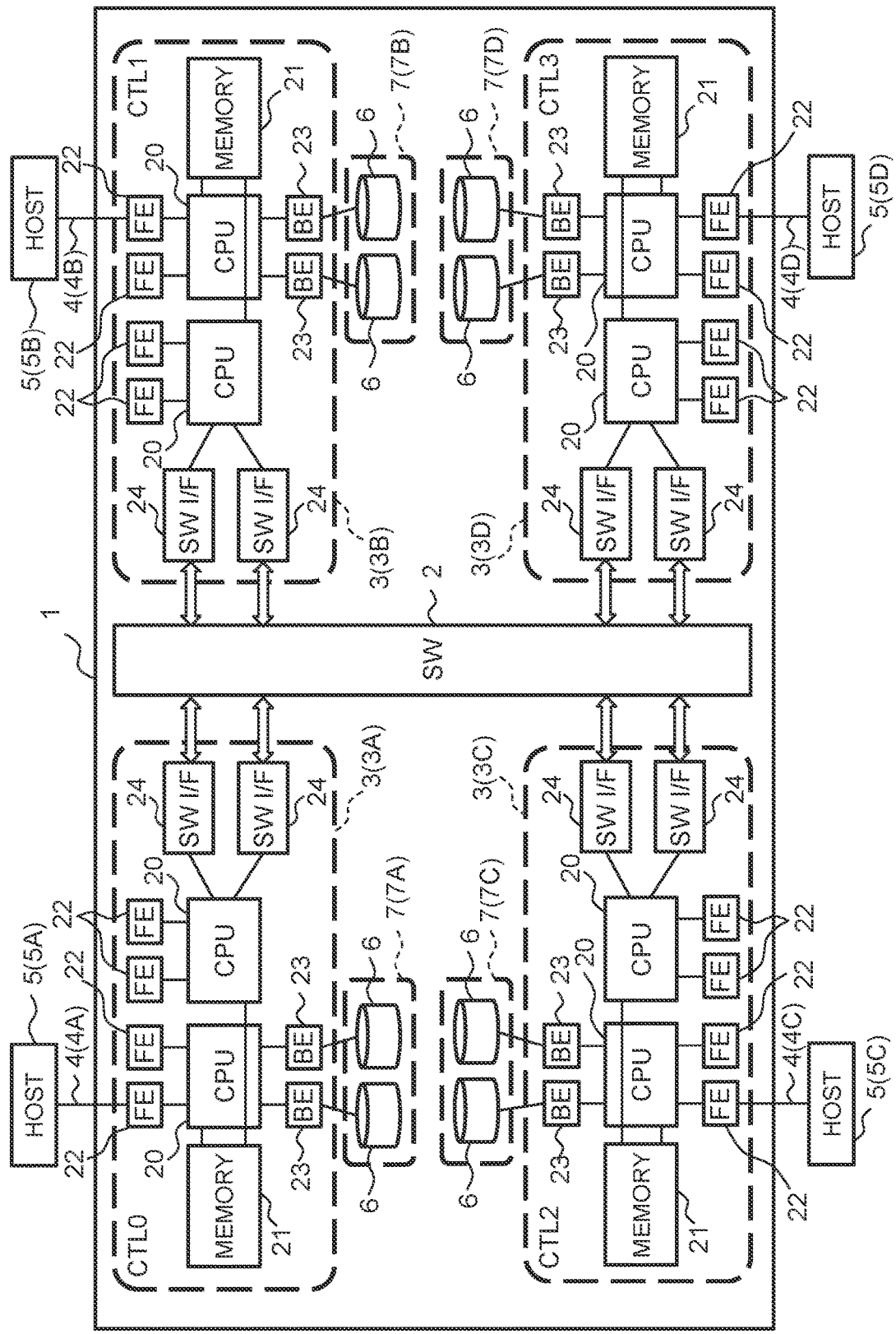
FIG. 1 is a block diagram showing a configuration example of the storage system according to the first embodiment.

An embodiment of the present invention is now explained with reference to the appended drawings. Embodiments are exemplifications for explaining the present invention, and certain descriptions are omitted or simplified as needed for clarifying the explanation of the present invention. The present invention can also be worked in other various modes or in a mode where a part or all of each mode has been combined. Unless specifically limited herein, each constituent element may be singular or plural.

When there are multiple constituent elements having the same or similar function, they may be explained by affixing a different suffix to the same reference numeral. Moreover, when there is no need to differentiate a plurality of constituent elements, they may be explained by omitting the suffixes.

First Embodiment (Configuration of Storage System 1 of First Embodiment)

FIG. 1 is a block diagram showing a configuration example of the storage system 1 according to the first embodiment. The storage system 1 is configured by comprising, for example, a plurality of storage controllers 3A (CTL0), 3B (CTL1), 3C (CTL2), 3D (CTL3) which are connected in a bilaterally communicable manner via an Ethernet switch 2. While FIG. 1 illustrates an example where a cluster (storage system 1) is configured from four storage controllers 3A to 3D, the number of storage controllers to configure the cluster (storage system 1) is not limited to four storage controllers. In the following explanation, when the storage controllers 3A to 3D do not need to be differentiated, they will be collectively referred to as the "storage controller 3".

Each storage controller 3 is connected to hosts 5A to 5D in a bilaterally communicable manner via communication networks 4A to 4D. Note that at least a part of the communication networks 4A to 4D may be common, or all of the communication networks 4A to 4D may be the same communication network. Similarly, at least a part of the hosts 5A to 5D may be common, or all of the hosts 5A to 5D may be the same host. In the following explanation, when the communication networks 4A to 4D do not need to be particularly differentiated, they will be collectively referred to as the "communication network 4", and when the hosts 5A to 5D do not need to be particularly differentiated, they will be collectively referred to as the "host 5".

The host 5 is a computer device which sends a read command or a write command to the storage controller 3 via the communication network 4 based on a user operation or loaded application software, and is configured from a mainframe, an open system server or the like. When the host 5 is a mainframe, communication between the host 5 and the storage controller 3 is performed, for example, according to a communication protocol such as FICON (Fibre Connection: registered trademark), ESCON (Enterprise System Connection: registered trademark), ACONARC (Advanced Connection Architecture: registered trademark), or FIBARC (Fibre Connection Architecture: registered trademark). Moreover, when the host 5 is an open system server, communication between the host 5 and the storage controller 3 is performed, for example, according to a communication protocol such as FC (Fibre Channel), TCP/IP (Transmission Control Protocol/Internet Protocol), or iSCSI (Internet Small Computer System Interface).

Connected to each of the storage controllers 3A to 3D are storage devices 7A to 7D which are each configured from one or more memory devices 6. In the following explanation, when the storage devices 7A to 7D do not need to be particularly differentiated, they will be collectively referred to as the "storage device 7". Note that, while FIG. 1 illustrates an example where individual storage devices 7A to 7D are respectively connected to individual storage controllers 3A to 3D, the configuration may also be such that a part or all of the storage controllers 3A to 3D are connected to the same storage device 7A to 7D. One storage apparatus is configured from one storage controller 3 and one storage device 7.

The memory device 6 is configured, for example, from a hard disk device, a semiconductor memory device, an optical disk device, a magneto optical disk device or the like. When a hard disk device is used as the memory device 6, an FC (Fibre Channel) disk, a SCSI (Small Computer System Interface) disk, a SATA disk, an ATA (AT Attachment) disk, a SAS (Serial Attached SCSI) disk or the like may be used. Moreover, for example, various types of memory devices 6 such as a flash memory (SSD: Solid State Drive), an MRAM (Magnetoresistive Random Access Memory), a phase-change memory (Phase-Change Memory), a ReRAM (Resistive random-access memory), or an FeRAM (Ferroelectric Random Access Memory) may also be used. Furthermore, for example, the configuration may also be such that different types of memory devices coexist in the storage device 7.

A storage area provided by one or more memory devices 6 is managed as a pool, and one or more logical volumes (hereinafter referred to as the "logical volumes") are defined on the pool and provided to the host 5 as a storage area for reading and writing data. The storage area in the logical volume is managed by being divided into small areas of a predetermined size referred to as logical blocks, and a unique address referred to as an LBA (Logical Block Address) is assigned to the logical blocks. When the host is to read/write data from/to the logical volume, the host sends, to the storage controller 3, a read command or a write command designating the identifier of the logical volume (LUN: Logical Unit Number), the LBA of the first logical block of an area for reading and writing the data in the logical volume, and the data length of the data to be read/written.

Each storage controller 3 is configured by comprising one or more CPUs 20, a memory 21, a front-end 22, a back-end 23 and a switch interface 24.

The CPU 20 is a processor that governs the operational control of the overall storage controller 3. Moreover, the memory 21 is configured, for example, from a non-transitory computer readable recording medium such as semiconductor memory such as a DIMM (Dual Inline Memory Module) and/or a hard disk device, and is used for retaining various programs and data.

The front-end 22 is an interface device which performs protocol conversion during communication with the host 5 via the communication network 4. The front-end 22 sends and receives commands and data to and from the host 5 based on the control of the CPU 20.

The back-end 23 is an interface device for inputting/outputting data to and from the storage device 7. The CPU 20 reads/writes data from/to the memory device 6 which provides the storage area of the designated logical volume via the back-end 23 according to a request from the host 5.

The switch interface 24 is a device which bilaterally communicates with another storage controller 3 using RoCE (RDMA over Converged Ethernet) via the Ethernet switch 2. RoCE is a protocol for realizing RDMA (Remote Direct Memory Access) on a highly reliable Ethernet referred to as the Converged Ethernet. Details of the switch interface 24 will be described later with reference to FIG. 2. The switch interface 24 is connected to a switch interface 24 in another storage controller 3 via the Ethernet switch 2.

(Configuration of Storage Controller 3)

Figure 2:
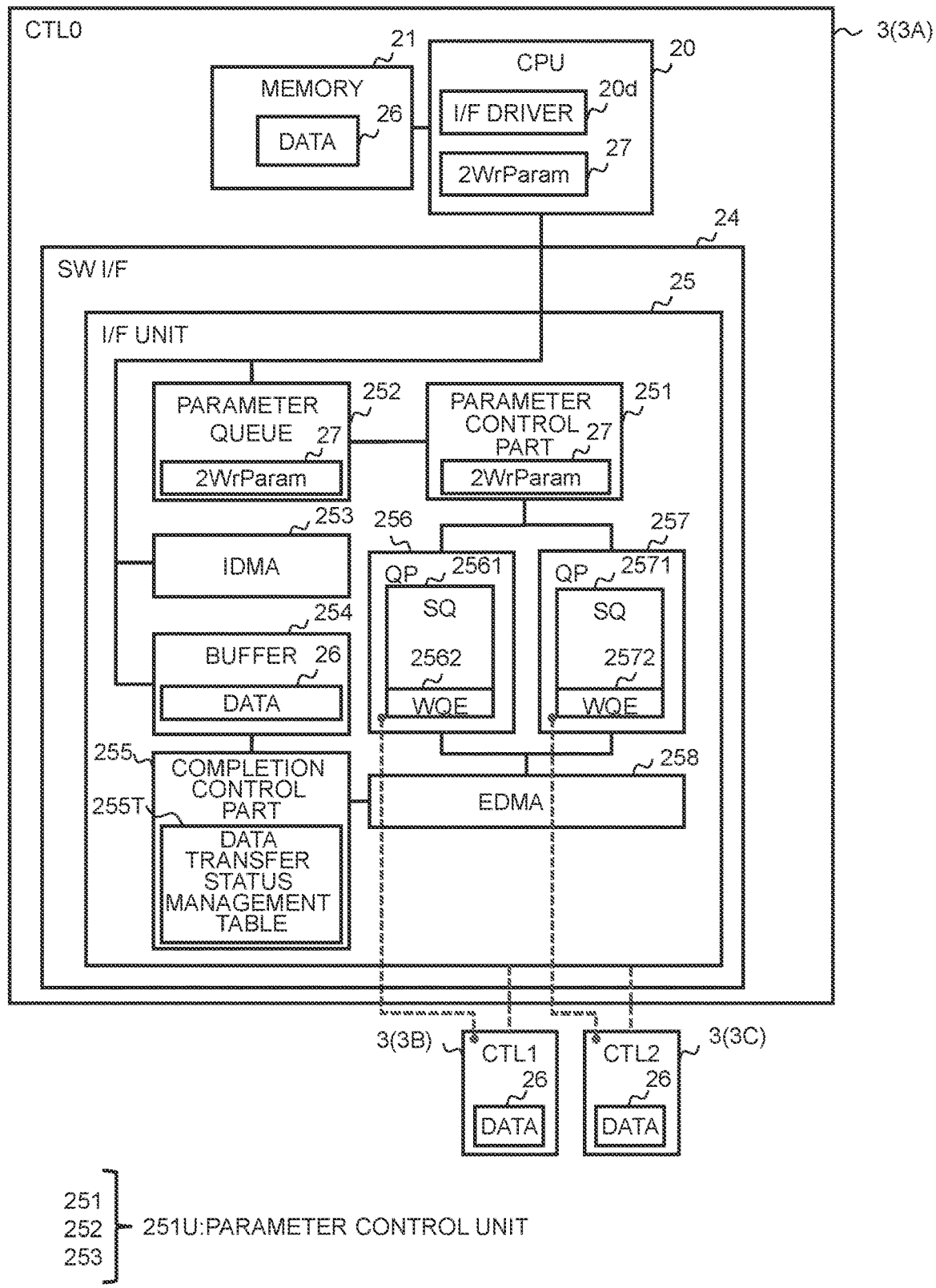
FIG. 2 is a diagram showing a configuration example of the storage controller according to the first embodiment.

FIG. 2 is a diagram showing a configuration example of the storage controller 3 according to the first embodiment. In FIG. 2, the functions related to the writing of data will be mainly explained, and the explanation of functions related to the reading of data will be omitted. FIG. 2 explains a case of dual writing the data retained in the storage controller 3A (CTL0) to the storage controllers 3B (CTL1), 3C (CTL2). The configuration and processing of the storage controller 3 are the same in each of the storage controllers 3A to 3D. In FIG. 2, illustrations of the host 5, the front-end 22, the back-end 23, and the memory device 6 have been omitted. Moreover, in FIG. 2, the illustration of multiple CPUs 20 has been omitted.

The CPU 20 includes a plurality of microprocessors (MPs) (not shown). The CPU 20 assigns command processing or the like to one MP among the respective MPs built therein. The CPU 20 can process a plurality of commands in parallel. While the processing handled by the CPU 20 is actually executed by one of the MPs, there is no need to strictly differentiate the CPU 20 and the MPs. The CPU 20 designates a dual write parameter 27 and instructs the switch interface 24 to dual-write the data 26 in the memory 21.

The storage area of the memory 21 is managed by being classified, for example, into a work area to be provided to the CPU 20, a cache area which retains the data received from the host 5 or another storage controller 3, a management information area which stores tables to be used by each MP, and a program area which stores computer programs to be executed by each MP. Nevertheless, the configuration may also be such that the memory 21 is prepared for each area. In FIG. 2, the memory 21 stores the data 26 to undergo dual write processing.

The program area stores, for example, the operating system (not shown), driver software, microprograms and the like. Each MP executes various types of processing based on the microprograms. The driver software includes a type which realizes an I/F driver 20d on the CPU 20 by being read and executed by the CPU 20.

The switch interface 24 includes an interface unit 25 for communicating with another storage controller 3 by using the Ethernet adopting RoCE. The interface unit 25 may be configured from a PLD (Programmable Logic Device) such as an FPGA (Field Programmable Gate Array), but is not limited thereto.

The interface unit 25 includes, as function parts related to data write, a parameter control part 251, a parameter queue 252, an IDMA (Internal Direct Memory Access) 253, a buffer 254, a completion control part 255, QPs (Queue Pairs) 256, 257, SQs (Send Queues) 2561, 2571, and an EDMA (External Direct Memory Access) 258. The parameter control part 251, the parameter queue 252, and the IDMA 253 are included in a parameter control unit 251U. The completion control part 255 retains a data transfer status management table 255T (FIG. 4).

The QP is a logical port used for communication by devices when performing a RoCE transfer, and retained to form a pair with the devices of a communication partner. The QP is initially set with information required for communication such as the partner's address. In the example of FIG. 2, the storage controller 3A holds a QP for each of the storage controllers 3B, 3C of the communication partner in order to perform the RoCE transfer with each of the storage controllers 3B, 3C. The storage controller 3A includes a QP 256 which forms a pair with the QP of the storage controller 3B, and a QP 257 which forms a pair with the QP of the storage controller 3C. Generally speaking, there are multiple QPs, and the QPs 256, 257 are designated among the multiple QPs.

The SQ is a queue which stores a transfer request of RDMA, and there is one SQ for each QP. In the example of FIG. 2, a SQ 2561 exists for the QP 256, and a SQ 2571 exists for the QP 257. The Write/Read of data is executed by storing a WR (Work Request) in the SQ.

The WR is a request that is stored in the SQ by the subject of a transfer request when performing the RDMA transfer, and in this embodiment it is a parameter of RDMA. The WR stored in the SQ is managed in units of WQEs (Work Queue Elements). In FIG. 2, a WQE 2562 for the storage controller 3B corresponding to the dual write parameter (2WrParam) 27 is stored in the SQ 2561, and a WQE 2572 for the storage controller 3C is stored in the SQ 2571.

The IDMA 253 and the EDMA 258 execute the Write/Read of data based on RDMA of directly accessing the memory space of a different device without going through the OS. The IDMA 253 realizes DMA which is concluded within the storage controller 3A, and the EDMA 258 realizes DMA to a different storage controller 3. In FIG. 2, while the IDMA 253 and the EDMA 258 are configured separately, they may also be integrated.

Figure 3:
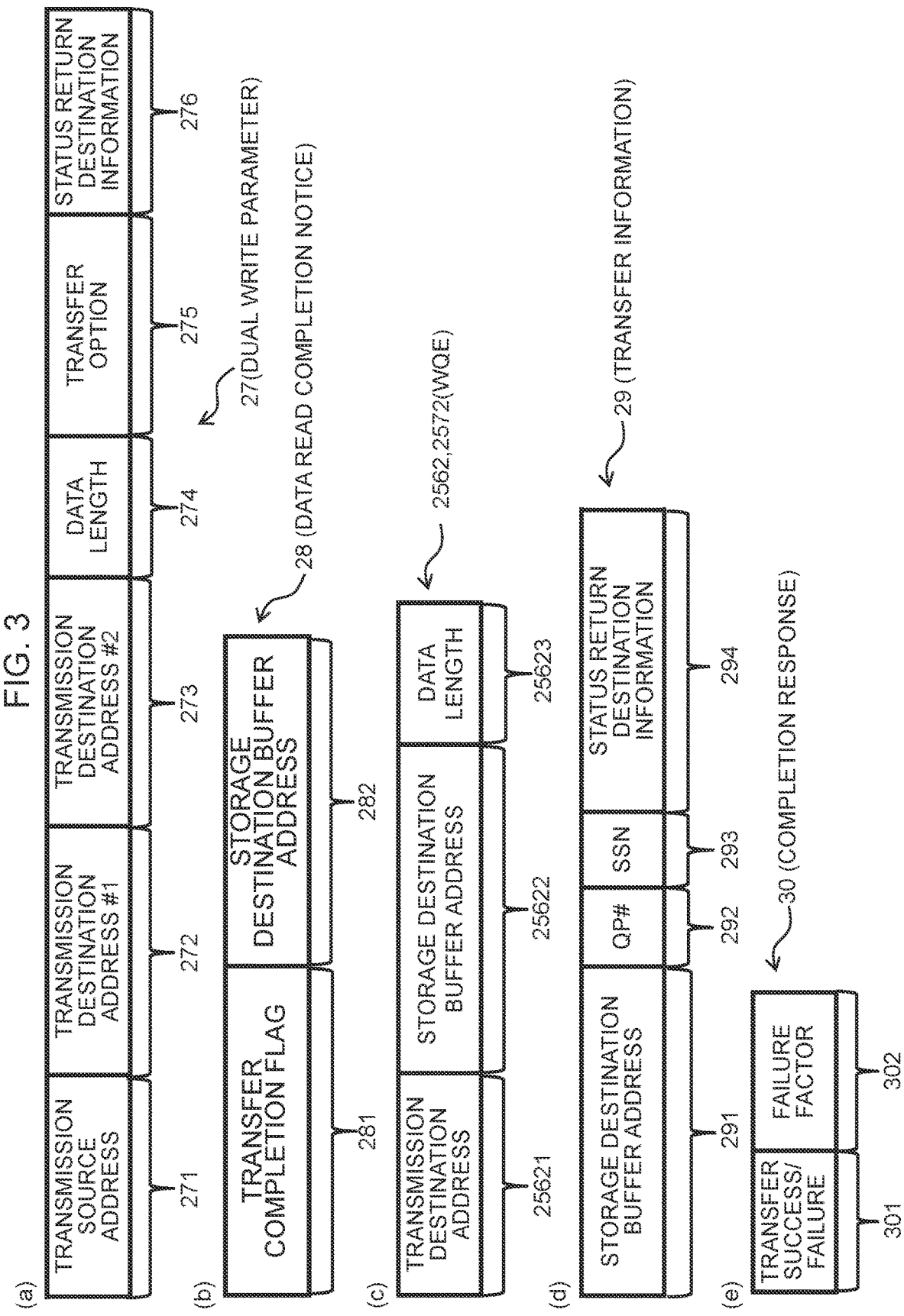
FIG. 3 is a diagram showing a format example of the various types of data according to the first embodiment.

The parameter control part 251 extracts and decodes the dual write parameter 27 which instructs the dual write of the data 26 in the memory 21 written in the parameter queue 252 by the CPU 20. FIG. 3 is a diagram showing a format example of the various types of data according to the first embodiment.

As shown in FIG. 3(a), the dual write parameter 27 includes a transmission source address 271, a transmission destination address 272 (#1), a transmission destination address 273 (#2), a data length 274, a transfer option 275, and status return destination information 276.

The transmission source address 271 is an address which identifies the storage controller 3 of the transmission source retaining the data 26 to be transferred for the dual write and the storage location of the data 26 in the transmission source. The transmission destination addresses 272, 273 are addresses which identify the two storage controllers 3 of the dual write destination of data and the storage location of the data 26 in the transmission destination. The data length 274 is the size of the data to undergo dual write processing. The transfer option 275 is a data protection code such as T10DIF. The status return destination information 276 is the address which identifies the storage controller 3 of the return destination of the transfer completion information STS (Status) indicating the progress of the dual write processing intended by the dual write parameter 27 and the storage location of the transfer completion information STS.

The parameter control part 251 confirms the free space of the buffer 254 according to the contents of the decoded dual write parameter 27. When the buffer 254 has a free space capable of storing the data 26 having the data length 274 of the dual write parameter 27, the parameter control part 251 reads the data 26 stored in the memory 21 via the DMA function of the IDMA 253, and stores the data 26 in the buffer 254.

When the IDMA 253 completes storing the data 26 in the buffer 254, the IDMA 253 sends, to the parameter control part 251, a data read completion notice 28 indicating the reading of the data 26 and the completion of storage of the data 26 in the buffer 254. As shown in FIG. 3(b), the data read completion notice 28 includes the columns of a transfer completion flag 281 and a storage destination buffer address 282. The transfer completion flag 281 is information indicating the reading of data and the completion of storage of the data in the buffer. The storage destination buffer address 282 indicates the address in the buffer 254 where the data 26 has been stored.

The parameter control part 251 stores each of the WQEs 2562, 2572 in the SQs 2561, 2571 of the QPs 256, 257 corresponding to each of the storage controllers 3B, 3C of the dual write destination by using the dual write parameter 27 corresponding to the data 26 in which the storage thereof in the buffer 254 has been completed. As shown in FIG. 3(c), the WQEs 2562, 2572 include the columns of a transmission destination address 25621, a storage destination buffer address 25622, and a data length 25623. The transmission destination address 25621 of the WQEs 2562, 2572 is succeeded from the transmission destination addresses 272, 273 of the dual write parameter 27, the storage destination buffer address 25622 is succeeded from the storage destination buffer address 282 of the data read completion notice 28, and the data length 25623 is succeeded from the data length 274 of the dual write parameter 27, respectively.

Moreover, the parameter control part 251 delivers transfer information 29 to the completion control part 255 simultaneously with the storage of the WQEs 2562, 2572. As shown in FIG. 3(d), the transfer information 29 includes the columns of a storage destination buffer address 291, a QP #292, an SSN (Send Sequence Number) 293, and status return destination information 294. The storage destination buffer address 291 is the storage destination buffer #corresponding to the storage destination buffer address 282 in the data transfer status management table 255T. The QP #292 indicates the number of the QP used for the data 26 stored in the buffer of the storage destination buffer address 291. The SSN 293 is the identification information of the WQE, and each WQE is uniquely assigned within one QP. The status return destination information 294 includes the address which identifies the storage controller 3 of the return destination of the status of dual write being managed by the completion control part 255, and the storage location.

The EDMA 258 processes the WQEs 2562, 2572 stored in the QPs 256, 257, and DMA transfers the data 26 to each memory 21 of each of the storage controllers 3B, 3C. When a completion response 30 of the DMA transfer of the data 26 is returned from each of the storage controllers 3B, 3C, the EDMA 258 delivers each completion response 30 to the completion control part 255. As shown in FIG. 3(e), the completion response 30 includes the columns of a transfer success/failure 301 and a failure factor 302. The transfer success/failure 301 is flag information indicating the success/failure of the data transfer of each QP executed by the EDMA 258, and transfer success=1, and transfer failure=0. The failure factor 302 shows the failure factor when the transfer success/failure 301 is transfer failure=0.

When the completion control part 255 receives the completion response 30, the completion control part 255 stores the transfer result in the data transfer status management table 255T. FIG. 4 is a diagram showing a configuration example of the management table 255T according to the first embodiment. The data transfer status management table 255T is a table placed in a storage area within the completion control part 255, and which manages, in units of data to undergo dual write processing, the progress of dual write to another storage controller 3.

The data transfer status management table 255T includes storage location information 255T1, return destination information 255T2, data transfer information 255T3, and data transfer information 255T4.

The storage location information 255T1 includes a buffer #, a buffer address, a STS return destination CTL (controller) #, a STS return destination address, a QP1 #, a QP1 SSN, a QP1 completion flag, a QP1 STS, a QP2 #, a QP2 SSN, a QP2 completion flag, and a QP2 STS. The buffer #and the buffer address uniquely indicate the storage location of the data 26 in the buffer 254.

The return destination information 255T2 includes a STS return destination CTL #and a STS return destination address, and uniquely indicates the return destination of the STS. The data transfer information 255T3 relates to one QP1 of the dual write data, and includes a QP1 #, a QP1 SSN, a QP1 completion flag, and a QP1 STS. The QP1 #is a number of one QP of the dual write data. The QP1 SSN is identification information of the WQE stored in the SQ within the QP1. The QP1 completion flag indicates whether the data transfer based on the WQE stored in the QP1 is complete/incomplete. The QP1 STS is OK when the QP1 completion flag=1, and is NULL in all other cases. The data transfer information 255T4 is the same as the data transfer information 255T3 in relation to the other QP2 of the dual write data.

The buffer address of the data transfer status management table 255T stores the storage destination buffer address 291 of the transfer information 29. The return destination information 255T2 (STS return destination CTL #and STS return destination address) stores the status return destination information 294. The QP1 #of the data transfer information 255T3 stores the QP #292. The QP1 SSN stores the SSN 293. The QP1 STS stores a transfer success/failure 301 and a failure factor 302. The data transfer information 255T4 of the data transfer status management table 255T also stores the same information as the data transfer information 255T3.

The example shown in FIG. 4 shows that, since the QP1 completion flag and the QP2 completion flag are both "1" and the QP1 STS and the QP2 STS are both "OK" with the dual write processing pertaining to the row of buffer #=0, the dual write processing has been completed normally. Moreover, the example shown in FIG. 4 shows that, while the QP1 completion flag is "1" and the QP1 STS is "OK" in the dual write processing pertaining to the row of buffer #1, since the QP2 completion flag is "0" and the QP2 STS is "NULL (blank)", only the write processing on the QP1 side has been completed normally and the write processing on the QP2 side is waiting completion. Moreover, the example shown in FIG. 4 shows that, in the row of buffer #2, all columns are "NULL (blank)" and the buffer is of a free status. Moreover, the example shown in FIG. 4 shows that, while the QP1 completion flag is "NULL (blank)" and in a completion standby status and the QP2 completion flag is "1" in the dual write processing pertaining to the row of buffer #3, since the QP2 STS is "NG (retransmission failure)", the fact of STS=dual write failure is scheduled to be returned to the storage controller 3A (CTL0) of the dual write request source after the write processing on the QP1 side is completed.

When the QP1 completion flag and the QP2 completion flag are stored in the data transfer status management table 255T, the completion control part 255 generates a transfer completion information STS, and sends the STS to the CPU 20 of the request source. The transfer completion information STS includes information of a data transfer success/failure of each QP, and a failure factor in the case of data transfer failure.

When the CPU 20 of the request source receives the transfer completion information STS, since it is dual write complete, the dual write processing is ended. Moreover, after generating the transfer completion information STS, the completion control part 255 releases the transferred data 26 remaining in the buffer 254.

Note that the parameter control part 251 confirms whether the buffer 254 has a free space capable of storing the data 26 to undergo dual write processing and, when there is no free space, the parameter control part 251 switches to a normal RoCE transfer, and stores the WQE 2562 in the SQ 2561 of the QP 256 and stores the WQE 2572 in the SQ 2571 of the QP 257 without storing the data 26 of the memory 21 in the buffer 254. Subsequently, the EDMA 258 processes the WQEs 2562, 2572 and directly acquires the data 26 from the memory 21 individually without going through the buffer 254, and performs a normal RoCE transfer of transferring data to each of the storage controllers 3B, 3C.

The series of processing of dual writing the same data from the storage controller 3A (CTL0) to the storage controllers 3B (CTL1) and 3C (CTL2) according to the first embodiment is now explained with reference to FIG. 5 to FIG. 7.

(Operation of Storage Controller (from Dual Write Start to WQE Generation))

Figure 5:
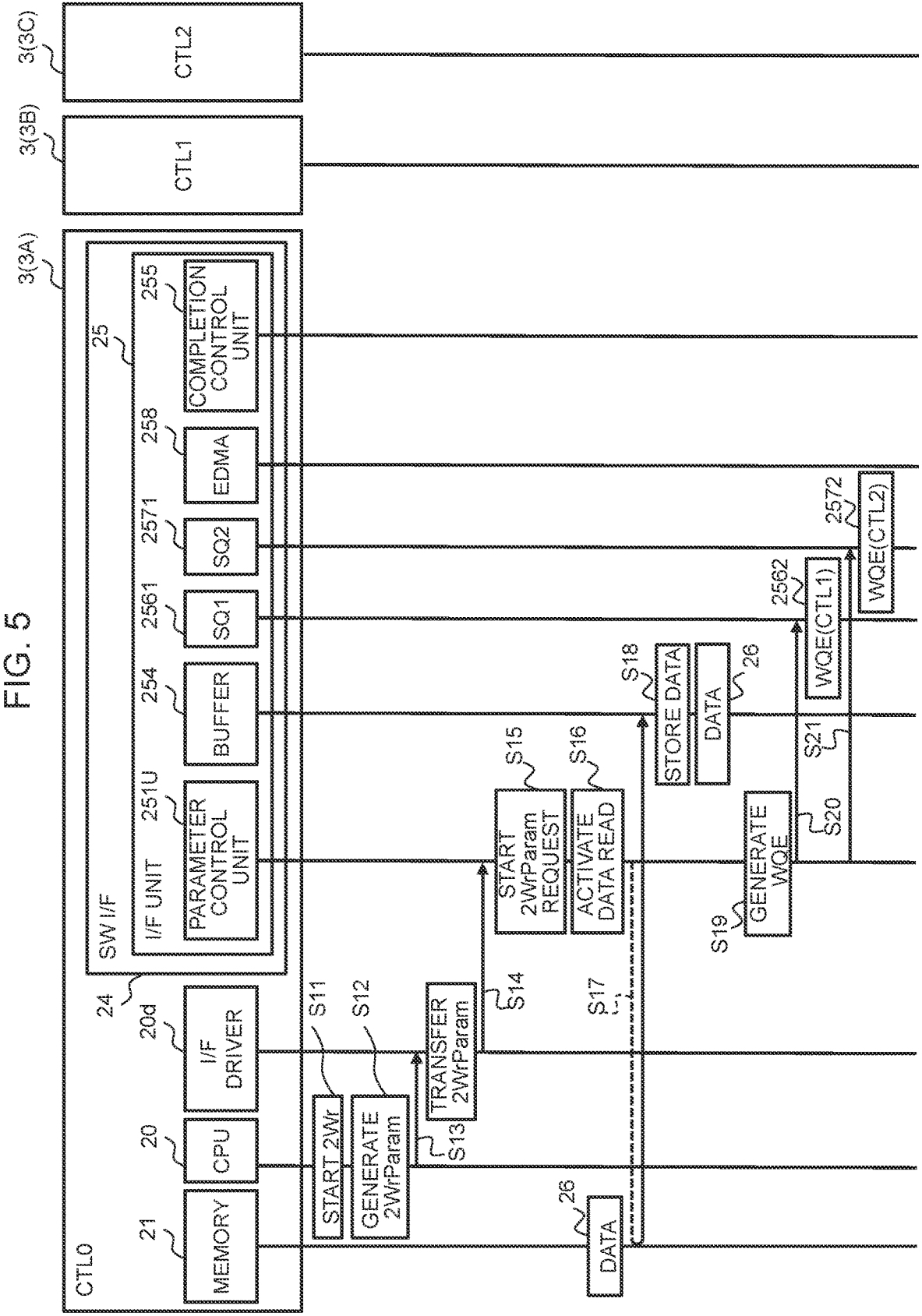
FIG. 5 is a sequence diagram showing a transfer operation (from dual write start to WQE generation) according to the first embodiment.

FIG. 5 is a sequence diagram showing a transfer operation (from dual write start to WQE generation) according to the first embodiment. Foremost, the CPU 20 (CTL0) starts the dual write processing (S11). Next, the CPU 20 (CTL0) generates the dual write parameter (2WrParam) 27 for dual writing the data 26 to the storage controllers 3B (CTL1) and 3C (CTL2) (S12), and instructs the I/F driver 20d to transfer the dual write parameter 27 (S13).

Next, the I/F driver 20d transfers the dual write parameter 27 to the parameter control unit 251U of the interface unit 25 of the switch interface 24 (S14). The dual write parameter 27 is stored in the parameter queue 252 of the parameter control unit 251U.

Next, the parameter control part 251 of the parameter control unit 251U extracts and decodes the dual write parameter 27 stored in the parameter queue 252, and starts a request according to the dual write parameter 27 (S15). In other words, the parameter control part 251 confirms the free space of the buffer 254 and, when the buffer 254 has a free space capable of storing the data 26 to undergo dual write processing, activates the reading of the data 26 in the memory 21 of the storage controller 3A (CTL0) (S16).

Next, the IDMA 253 of the parameter control unit 251U accesses the memory 21 of the storage controller 3A (CTL0) and reads the data 26 (S17), and stores the data 26 in the buffer 254 (S18). Since the reading of data in the memory 21 upon performing dual write processing is only performed once at step S17, the bandwidth consumption between the switch interface 24 and the memory 21 can be reduced. When the data 26 is stored in the buffer 254, the IDMA 253 sends the data read completion notice 28 to the parameter control part 251.

Next, the parameter control part 251 of the parameter control unit 251U generates the work requests (WQEs 2562, 2572) to be stored in the QPs 256, 257 respectively corresponding to the storage controllers 3B (CTL1) and 3C (CTL2) of the dual write destination by using the dual write parameter 27 for which data reading has been completed (S19), and stores the work requests in each of the SQs 2561, 2672 (S20, S21).

(Operation of Storage Controller (from DMA Transfer to Dual Write Complete Determination))

Figure 6:
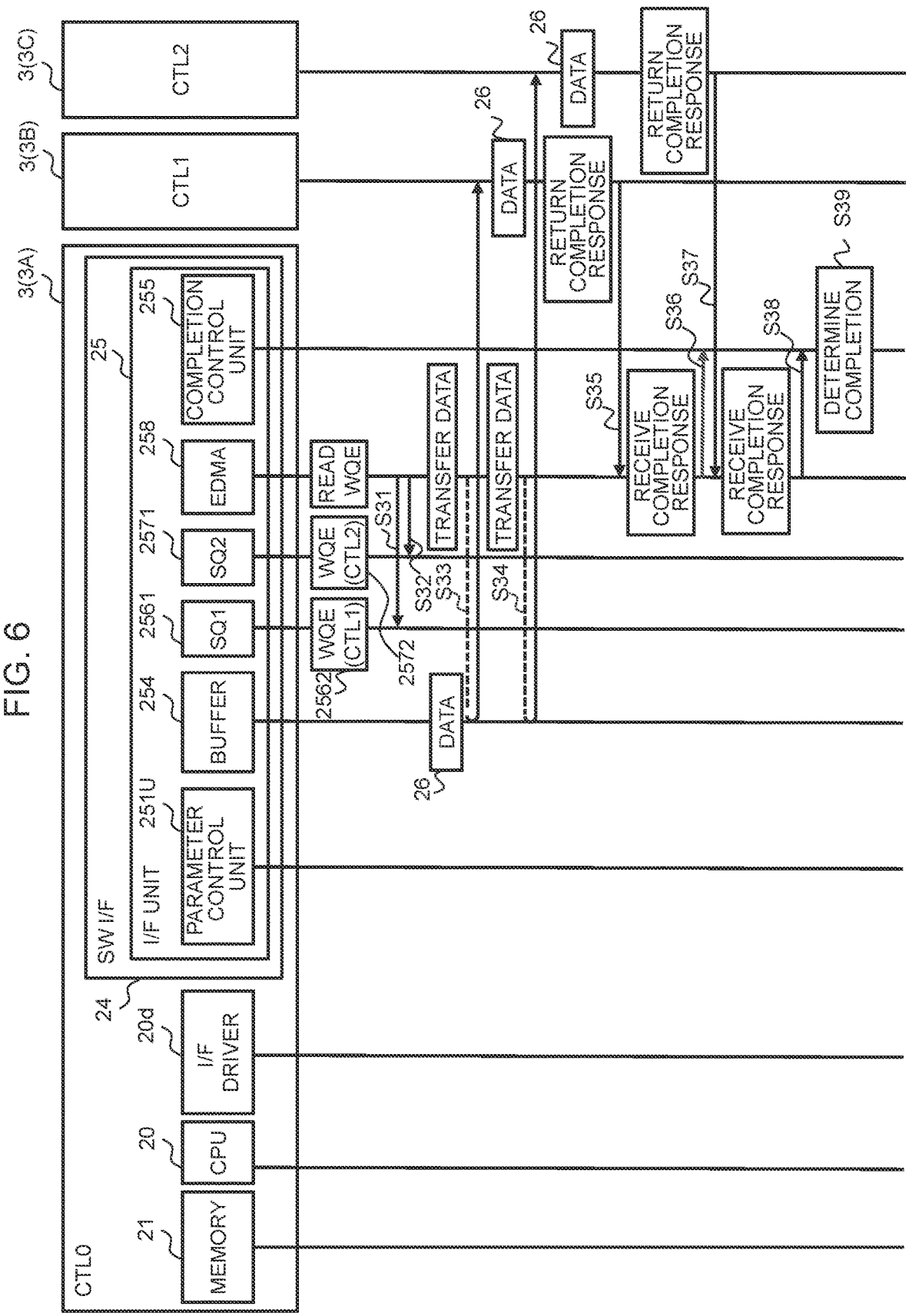
FIG. 6 is a sequence diagram showing a transfer operation (from DMA transfer to dual write complete determination) according to the first embodiment.

FIG. 6 is a sequence diagram showing a transfer operation (from DMA transfer to dual write complete determination) according to the first embodiment. Foremost, the EDMA 258 of the interface unit 25 of the storage controller 3A (CTL0) asynchronously reads each of the WQEs 2562, 2572 from the SQs 2561, 2571 (S31, S32). Subsequently, the processing of S31, S33, S35, S36 related to the WQE 2562 and the processing of S32, S34, S37, S38 related to the WQE 2572 are performed asynchronously.

The EDMA 258 reads the data 26 in the buffer 254 and transfers the data 26 to the storage controller 3B (CTL1) (S33). Similarly, the EDMA 258 reads the data 26 in the buffer 254 and transfers the data 26 to the storage controller 3C (CTL2) (S34).

When the data 26 is subject to storage processing and stored in the memory 21 within the own device, the storage controller 3B (CTL1) returns, to the EDMA 258 of the storage controller 3A (CTL0), a completion response 30 related to the transfer of data to the own storage controller (S35). When the EDMA 258 receives the completion response 30 from the storage controller 3B (CTL1), the EDMA 258 notifies the completion response 30 to the completion control part 255 (S36). The completion control part 255 stores information, based on the received completion response 30, in the QP1 completion flag and the QP1 STS, or in the QP2 completion flag and the QP2 STS, corresponding to the data transfer.

Similarly, when the data 26 is subject to storage processing and stored in the memory 21 within the own device, the storage controller 3C (CTL2) returns, to the EDMA 258 of the storage controller 3A (CTL0), a completion response 30 related to the transfer of data to the own storage controller (S37). When the EDMA 258 receives the completion response 30 from the storage controller 3C (CTL2), the EDMA 258 notifies the completion response 30 to the completion control part 255 (S38). The completion control part 255 stores information, based on the received completion response 30, in the QP1 completion flag and the QP1 STS, or in the QP2 completion flag and the QP2 STS, corresponding to the data transfer.

When the completion control part 255 is notified of the completion of transfer of data to each memory 21 of the storage controllers 3B (CTL1) and 3C (CTL2) based on S36 and S38, the completion control part 255 stores "1" in the columns of the QP1 completion flag and the QP2 completion flag and stores "OK" in the columns of the QP1 STS and the QP2 STS of the row of the corresponding buffer #in the data transfer status management table 255T. Moreover, when the transfer of data to each memory 21 of the storage controllers 3B (CTL1) and 3C (CTL2) is completed but the result was a failure, the completion control part 255 stores "1" in the columns of the QP1 completion flag and the QP2 completion flag and stores "NG (and failure factor)" in the columns of the QP1 STS and the QP2 STS of the row of the corresponding buffer #in the data transfer status management table 255T.

When information is stored in the QP1 completion flag and the QP1 STS and in the QP2 completion flag and the QP2 STS based on the completion response 30 received from the storage controllers 3B (CTL1) and 3C (CTL2), the completion control part 255 determines that the dual write is complete (S39).

(Operation of Storage Controller (from Dual Write Complete Determination to Dual Write Complete))

Figure 7:
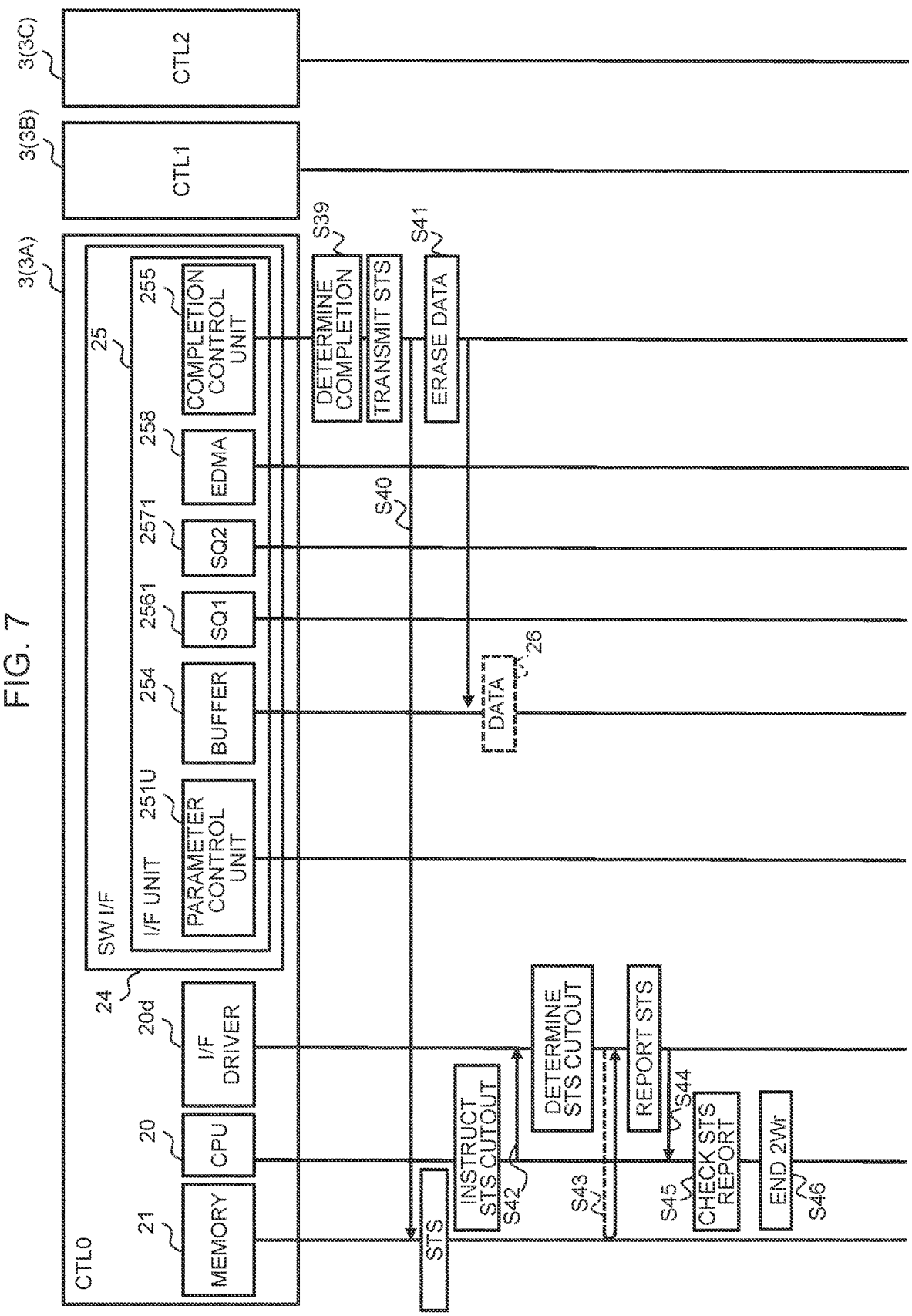
FIG. 7 is a sequence diagram showing a transfer operation (from dual write complete determination to dual write complete) according to the first embodiment.

FIG. 7 is a sequence diagram showing a transfer operation (from dual write complete determination to dual write complete) according to the first embodiment. When the completion determination (S39) is ended subsequent to FIG. 6, the completion control part 255 writes a transfer completion information STS in the memory 21 of the storage controller 3A (CTL0) (S40). The CPU 20 recognizes that the dual write of the data, which it instructed to undergo dual write processing, is complete based on the transfer completion information STS written in the memory 21. Next, the completion control part 255 erases the target data 26 from the buffer 254 after the transfer completion information STS is sent in S40 (S41).

Meanwhile, the CPU 20 of the storage controller 3A (CTL0) sends a STS result assessment instruction to the I/F driver 20d (S42).

The I/F driver 20d extracts, via polling, the transfer completion information STS stored in the memory 21 to determine the status (S43), and sends the determination result as a STS report to the CPU 20 (S44). The CPU 20 checks the STS report received from the I/F driver 20d (S45), determines the success/failure of the dual write processing, identifies the fault site in the case of a failure, and determines whether the retransmission of the write data is necessary. Based on these determination results, the retransmission of the write data to undergo dual write processing, and the degeneration of the system in which the fault site has been isolated, are performed. The CPU 20 then ends the dual write processing (S46).

Effect of First Embodiment

Figure 8:
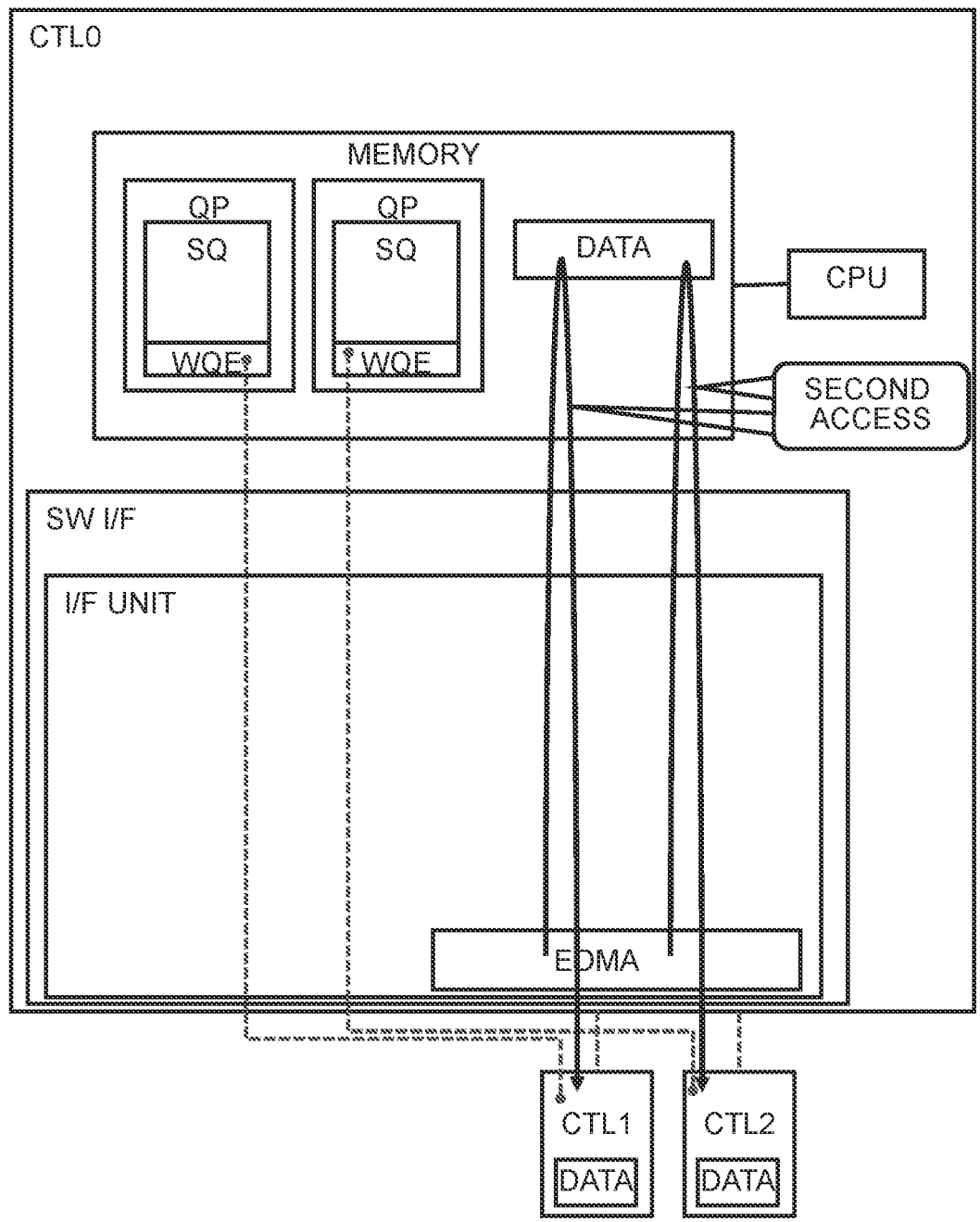
FIG. 8 is a diagram explaining the dual write processing according to conventional technology.
Figure 9:
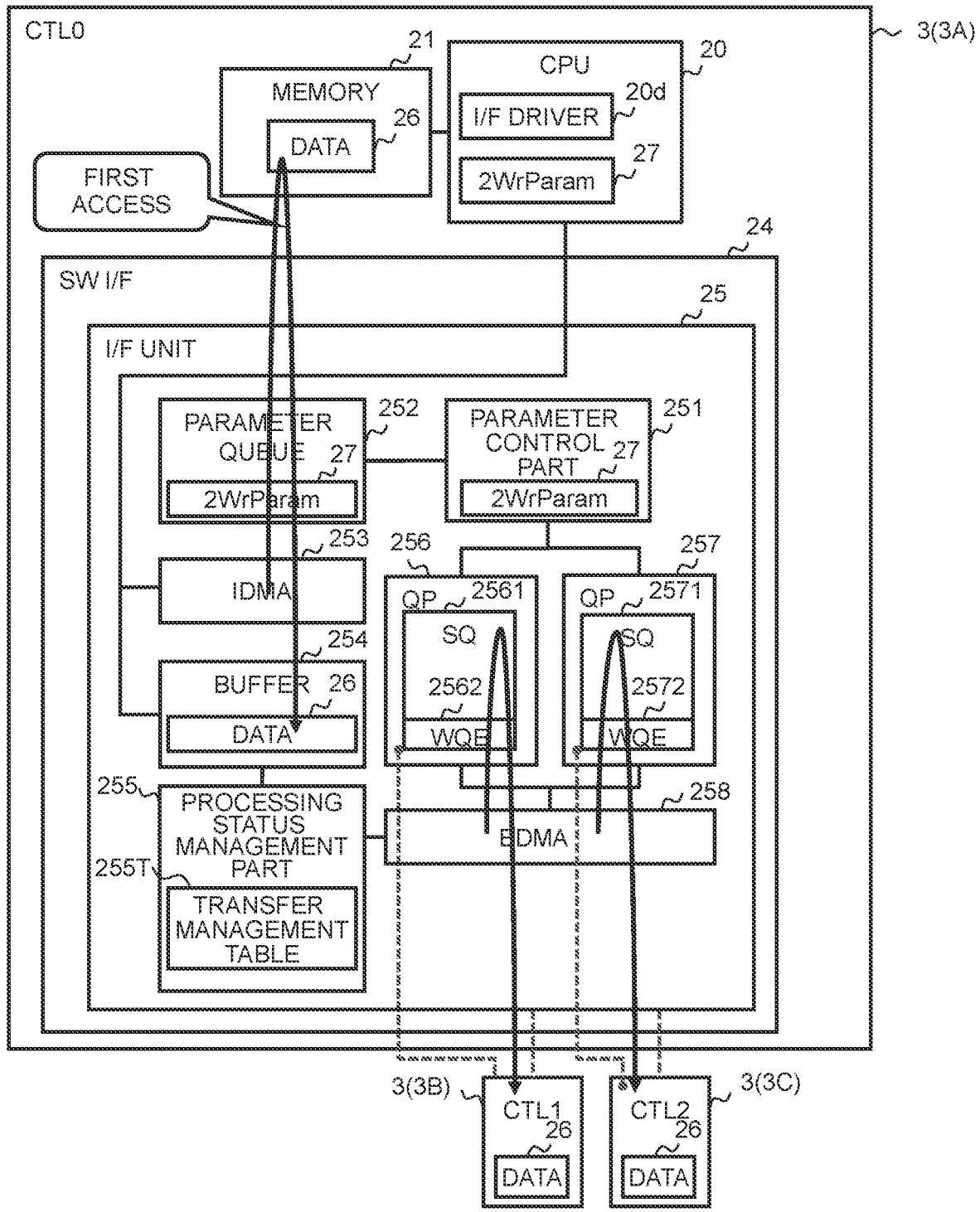
FIG. 9 is a diagram explaining the dual write processing according to the first embodiment.

The effect of the first embodiment is now explained with reference to FIG. 8 and FIG. 9. FIG. 8 is a diagram explaining the dual write processing according to conventional technology. FIG. 9 is a diagram explaining the dual write processing according to the first embodiment.

As shown in FIG. 8, when performing dual write in a multinode system, conventionally, it was necessary to store a WQE in each SQ corresponding to each storage controller in order to transfer data from the storage controller CTL0 to two storage controllers CTL1, CTL2 in a one-on-one RoCE. Thus, since data in the memory is accessed for each data transfer of DMA based on the processing of each WQE between the memory of the storage controller and the switch interface, the bandwidth between the memory and the switch interface was compressed as a result of these two accesses. This bandwidth may affect the storage system performance.

Thus, as shown in FIG. 9, in this embodiment, a dual write parameter (2WrParam) is stored in the parameter queue 252 within the interface unit 25, and the parameter control part 251 decodes the dual write parameter (2WrParam) and reads the data 26 in the memory 21 only once. When the data 26 is stored in the buffer 254 within the interface unit 25, in this embodiment, the dual write parameter is converted into two WQEs within the interface unit 25, and a WQE is stored in each SQ corresponding to each storage controller of the data transfer destination. In this embodiment, the parameter control part 251, the parameter queue 252, the buffer 254, and the completion control part 255 have been added to the RoCE so that the SQs of the two QPs will operate in a coordinated manner. As a result of adopting the foregoing configuration, since it is possible to limit the DMA data transfer between the CPU 20 and the memory 21 of the storage controller CTL0 and the switch interface 24 to a single DMA data transfer, consumption of the bandwidth between the CPU 20 and the memory 21, and the switch interface 24, can be reduced.

A single write parameter (1WrParam) when transferring data only to one storage controller 3 and a read parameter when reading data also use the parameter queue 252.

Second Embodiment

The first embodiment illustrated a case where the storage controller 3A (CTL0) dual writes the data 26 retained in the own device to two other storage controllers 3B (CTL1) and 3C (CTL2). Meanwhile, the second embodiment illustrates a case where the storage controller 3A (CTL0) dual writes the data 26 retained in another storage controller 3B (CTL1) to the own device and another storage controller 3C (CTL2). In the explanation of the second embodiment, differences in comparison to the first embodiment will be mainly explained.

The series of processing of dual writing the data retained in the storage controller 3B (CTL1) to the storage controllers 3A (CTL0) and 3C (CTL2) based on the dual write parameter transferred from the storage controller 3A (CTL0) according to the second embodiment is now explained with reference to FIG. 10 to FIG. 12.

(Transfer Operation According to Second Embodiment (from Dual Write Start to WQE Generation))

Figure 10:
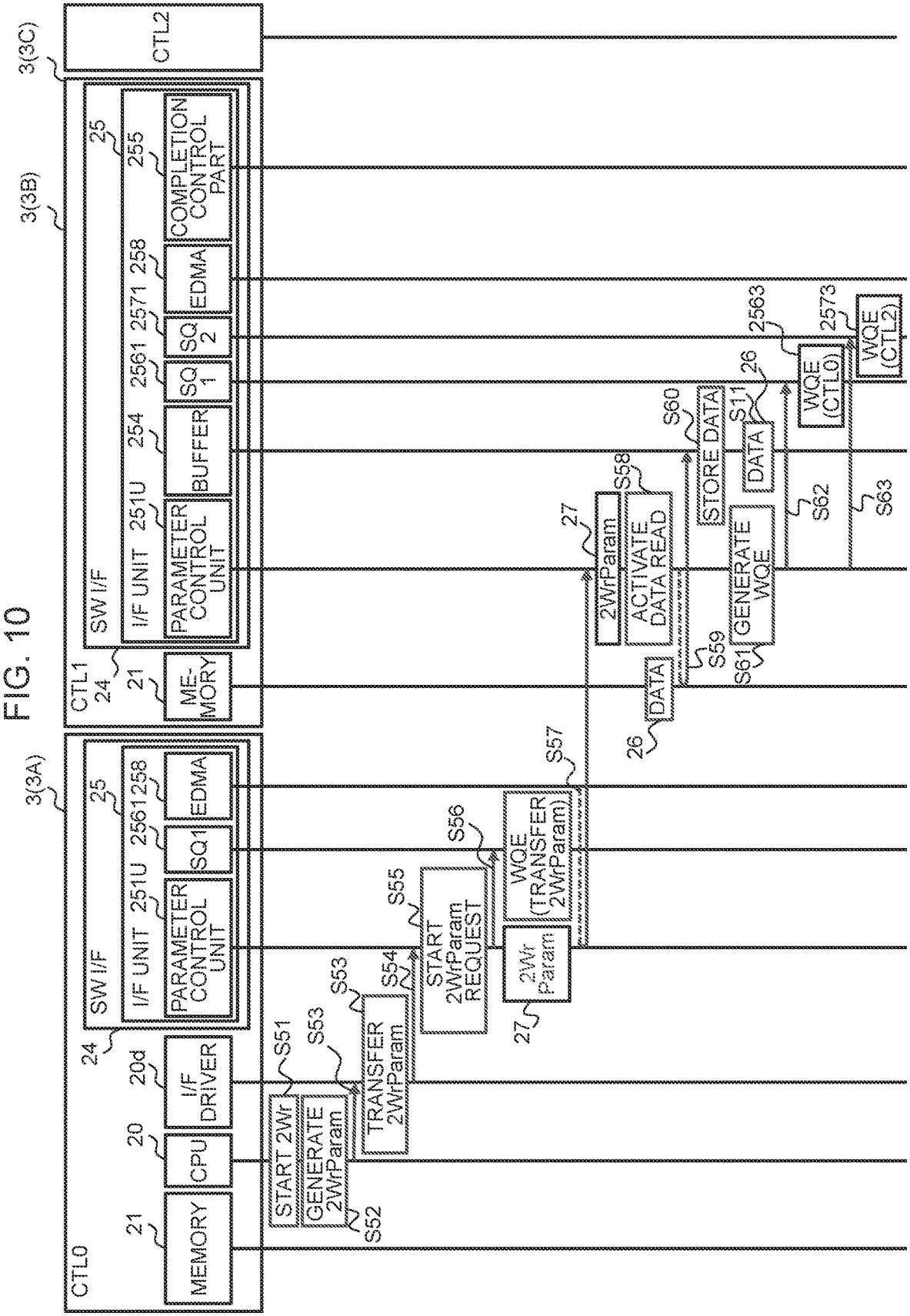
FIG. 10 is a sequence diagram showing a transfer operation (from dual write start to WQE generation) according to the second embodiment.

FIG. 10 is a sequence diagram showing a transfer operation (from dual write start to WQE generation) according to the second embodiment. Foremost, the CPU 20 (CTL0) starts the dual write processing (S51). Next, the CPU 20 (CTL0) generates the dual write parameter (2WrParam) 27 for dual writing the data 26 retained in the storage controller 3B (CTL1) to the storage controllers 3A (CTL0) and 3C (CTL2) (S52), and instructs the I/F driver 20d to transfer the dual write parameter 27 (S53).

Next, the I/F driver 20d transfers the dual write parameter 27 to the parameter control unit 251U of the interface unit 25 of the switch interface 24 (S54). The dual write parameter 27 is stored in the parameter queue 252 of the parameter control unit 251U.

Next, the parameter control part 251 of the parameter control unit 251U extracts and decodes the dual write parameter 27 stored in the parameter queue 252, and starts a request according to the dual write parameter 27 (S55). In other words, the parameter control part 251 recognizes that the dual write parameter 27 stored in the parameter queue 252 is for requesting the dual write of the data 26 retained in the storage controller 3B (CTL1), generates a WQE for transferring the dual write parameter 27 to the storage controller 3B (CTL1), and stores the WQE in the SQ 2561 (SQ1) corresponding to the storage controller 3B (CTL1) (S56). The EDMA 258 transfers the dual write parameter 27 stored in the parameter queue 252 to the parameter queue 252 of the parameter control unit 251U of the storage controller 3B (CTL1) by processing the WQE stored in the SQ 2561 (S57).

Next, the parameter control part 251 of the parameter control unit 251U of the storage controller 3B (CTL1) extracts and decodes the dual write parameter 27 stored in the parameter queue 252, and starts a request according to the dual write parameter 27. In other words, the parameter control part 251 recognizes that the dual write parameter 27 stored in the parameter queue 252 is for requesting the dual write of the data 26 retained in the storage controller 3B (CTL1), confirms the free space of the buffer 254, and, when the buffer 254 has a free space capable of storing the data 26 to undergo dual write processing, activates the reading of the data 26 in the memory 21 of the storage controller 3B (CTL1) (S58).

Note that, when the buffer 254 does not have a free space capable of storing the data 26 to undergo dual write processing, a normal RoCE transfer is performed in the same manner as the first embodiment.

Next, the IDMA 253 of the parameter control unit 251U accesses the memory 21 of the storage controller 3B (CTL1) and reads the data 26 (S59), and stores the data 26 in the buffer 254 (S60). Since the reading of data in the memory 21 upon performing dual write processing is only performed once at step S59, the bandwidth consumption between the switch interface 24 and the memory 21 can be reduced. When the data 26 is stored in the buffer 254, the IDMA 253 sends the data read completion notice 28 to the parameter control part 251.

Next, the parameter control part 251 of the parameter control unit 251U generates the WQEs 2563, 2573 to be stored in the QPs 256, 257 respectively corresponding to the storage controllers 3A (CTL0) and 3C (CTL2) of the dual write destination by using the dual write parameter 27 for which data reading has been completed (S61), and stores the WQEs 2563, 2573 in each of the SQs 2561, 2672 (S62, S63).

(Transfer Operation According to Second Embodiment (from DMA Transfer to Dual Write Complete Determination))

Figure 11:
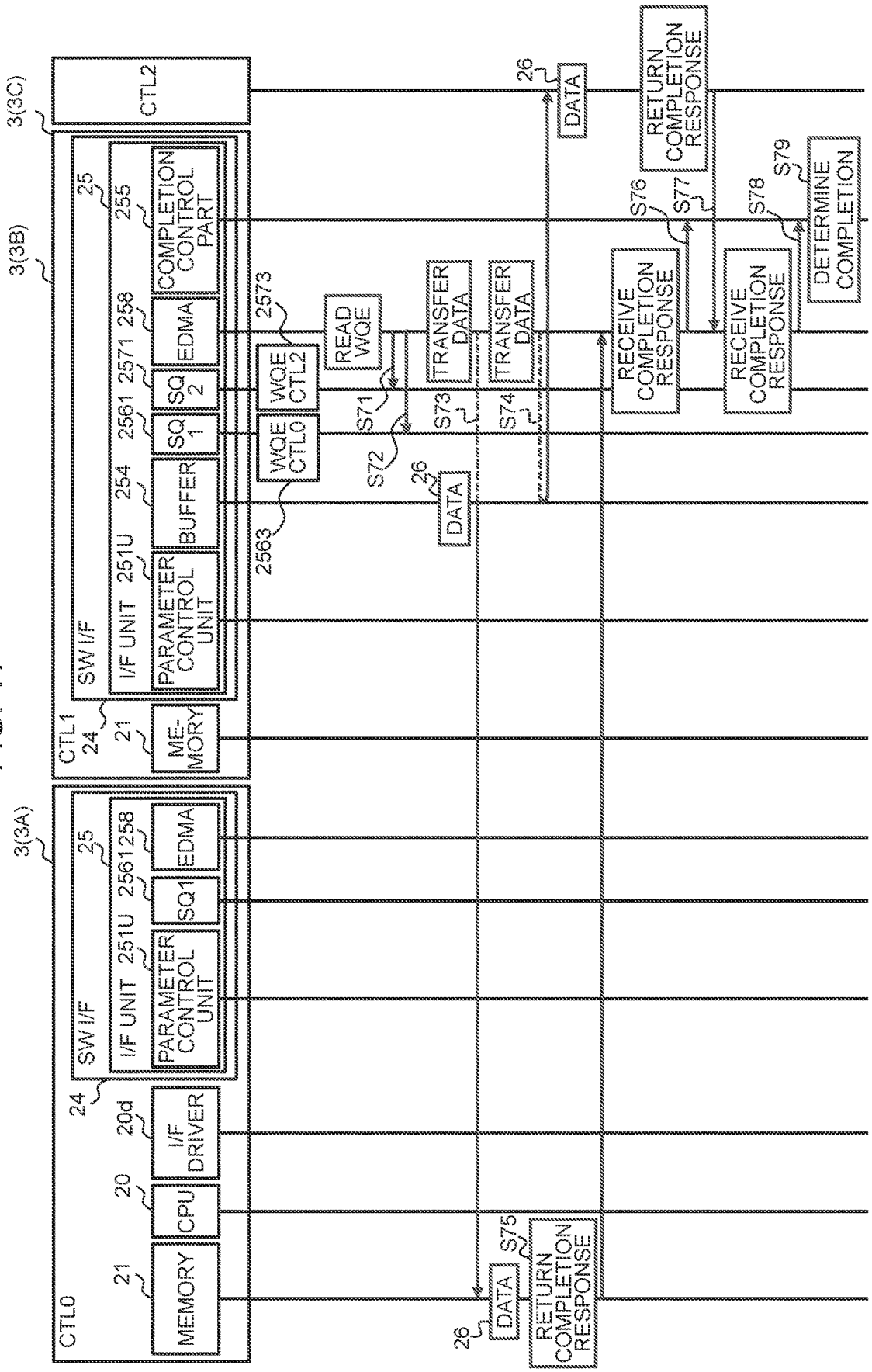
FIG. 11 is a sequence diagram showing a transfer operation (from DMA transfer to dual write complete determination) according to the second embodiment.

FIG. 11 is a sequence diagram showing a transfer operation (from DMA transfer to dual write complete determination) according to the second embodiment. Foremost, the EDMA 258 of the interface unit 25 of the storage controller 3B (CTL1) asynchronously reads each of the WQEs 2563, 2573 from the SQs 2561, 2571 (S71, S72). Subsequently, the processing of S71, S73, S75, S76 related to the WQE 2563 and the processing of S72, S74, S77, S78 related to the WQE 2572 are performed asynchronously.

The EDMA 258 reads the data 26 in the buffer 254 and DMA transfers the data 26 to the storage controller 3A (CTL0) and stores the data 26 in the memory 21 (S73). Similarly, the EDMA 258 reads the data 26 in the buffer 254 and DMA transfers the data 26 to the storage controller 3C (CTL2) and stores the data 26 in the memory 21 (S74).

When the data 26 is subject to storage processing and stored in the memory 21 within the own device, the storage controller 3A (CTL0) returns a completion response 30 to the EDMA 258 of the storage controller 3B (CTL1) (S75). When the EDMA 258 receives the completion response 30 from the storage controller 3A (CTL0), the EDMA 258 notifies the reception of the completion response to the completion control part 255 (S76).

Similarly, when the data 26 is subject to storage processing and stored in the memory 21 within the own device, the storage controller 3C (CTL2) returns a completion response 30 to the EDMA 258 of the storage controller 3B (CTL1) (S77). When the EDMA 258 receives the completion response 30 from the storage controller 3C (CTL2), the EDMA 258 notifies the reception of the completion response to the completion control part 255 (S78).

When information is stored in the QP1 completion flag and the QP1 STS and in the QP2 completion flag and the QP2 STS based on the completion response 30 received from the storage controllers 3A (CTL0) and 3C (CTL2), the completion control part 255 determines that the dual write is complete (S79).

(Transfer Operation According to Second Embodiment (from Dual Write Complete Determination to Dual Write Complete))

Figure 12:
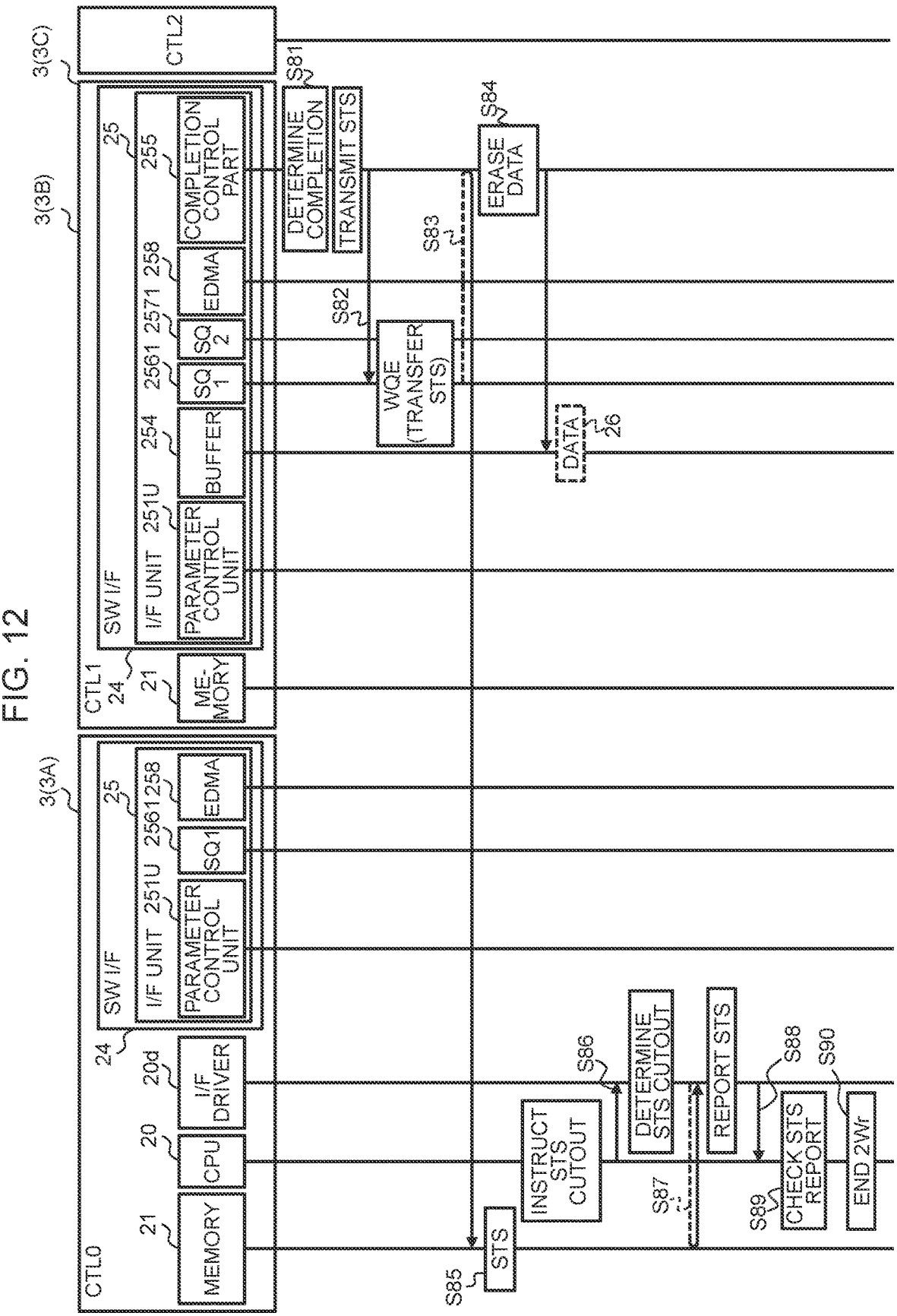
FIG. 12 is a sequence diagram showing a transfer operation (from dual write complete determination to dual write complete) according to the second embodiment.

FIG. 12 is a sequence diagram showing a transfer operation (from dual write complete determination to dual write complete) according to the second embodiment. When the completion determination (S79) is ended subsequent to FIG. 11, the completion control part 255 generates a transfer completion information STS to be sent to the memory 21 of the storage controller 3A (CTL0), and stores a WQE for transmission in the SQ 2561 corresponding to the storage controller 3A (CTL0) (S82). Next, the completion control part 255 sends the transfer completion information STS to the storage controller 3A (CTL0) by processing the WQE of the SQ 2561 (S83). Next, the completion control part 255 erases the target data 26 from the buffer 254 after the transfer completion information STS is sent in S83 (S84).

Meanwhile, the storage controller 3A (CTL0) stores, in the memory 21, the transfer completion information STS received from the completion control part 255 of the storage controller 3B (CTL1) (S85). The CPU 20 recognizes that the dual write of the data, which it instructed to undergo dual write processing, is complete based on the transfer completion information STS written in the memory 21. The CPU 20 of the storage controller 3A (CTL0) sends a STS result assessment instruction to the I/F driver 20d (S86).

The I/F driver 20d extracts, via polling, the transfer completion information STS stored in the memory 21 to determine the status (S87), and sends the determination result as a STS report to the CPU 20 (S88). The CPU 20 checks the STS report received from the I/F driver 20d (S89), determines the success/failure of the dual write processing, identifies the fault site in the case of a failure, and determines whether the retransmission control of the write data is necessary. Based on these determination results, the retransmission of the write data to undergo dual write processing, and the degeneration of the system in which the fault site has been isolated, are performed. The CPU 20 then ends the dual write processing (S90).

Effect of Second Embodiment

In the second embodiment, by designating data in the memory 21 of another storage controller 3 as the transmission source address 271 of the dual write parameter 27, the dual write parameter 27 is transferred between the storage controllers 3 until it reaches the storage controller 3 retaining the data to undergo dual write processing. The storage controller 3 executes dual write processing when the received dual write parameter 27 is instructing the dual write of the data 26 stored in the memory 21 of the own storage controller 3. Meanwhile, when the received dual write parameter 27 is instructing the dual write of the data 26 stored in the memory 21 of the other storage controller 3, the dual write parameter 27 is transferred to the other storage controller 3. Accordingly, the data 26 retained by the other storage controller 3 can also be subject to dual write processing merely be rewriting the dual write parameter 27.

Other Embodiments (1) The first and second embodiments described above illustrated a case of dual write in which the same data retained in the own storage controller 3 is asynchronously transferred to two other storage controllers 3. Nevertheless, without limitation to dual write, it is also possible to use one n-fold write parameter (nWrParam) (n is a natural number of 2 or more) and perform n-fold write in which the data retained in the own storage controller 3 or another storage controller 3 is asynchronously transferred to n-number of other storage controllers 3. In the foregoing case, with n-number of QPs as a pair of QPs, the QPs are set so as to form a pair in the storage controller 3 of the transmission source and the storage controller 3 of the transmission destination.

(2) When the size of the data 26 is greater than the free space of the buffer 254 upon acquiring the data 26 stored in the memory 21 and storing the data 26 in the buffer 254, the interface unit 25 may partition the data 26 into a size that can be stored in the buffer 254. Subsequently, the plurality of partitioned data that underwent the foregoing partitioning are stored in the buffer 254, two partition requests (WQEs) for writing the partitioned data in each of the two other storage controllers 3 is generated, and each of the generated partition requests is stored in the two SQs corresponding to each of the two other storage controllers 3. Subsequently, each partition request stored in each SQ is processed, and each processing of transferring the partitioned data stored in the buffer 254 to each of the two other storage controllers 3 may be executed for all of the partitioned data.

(3) Hardware of Computer 500

Figure 13:
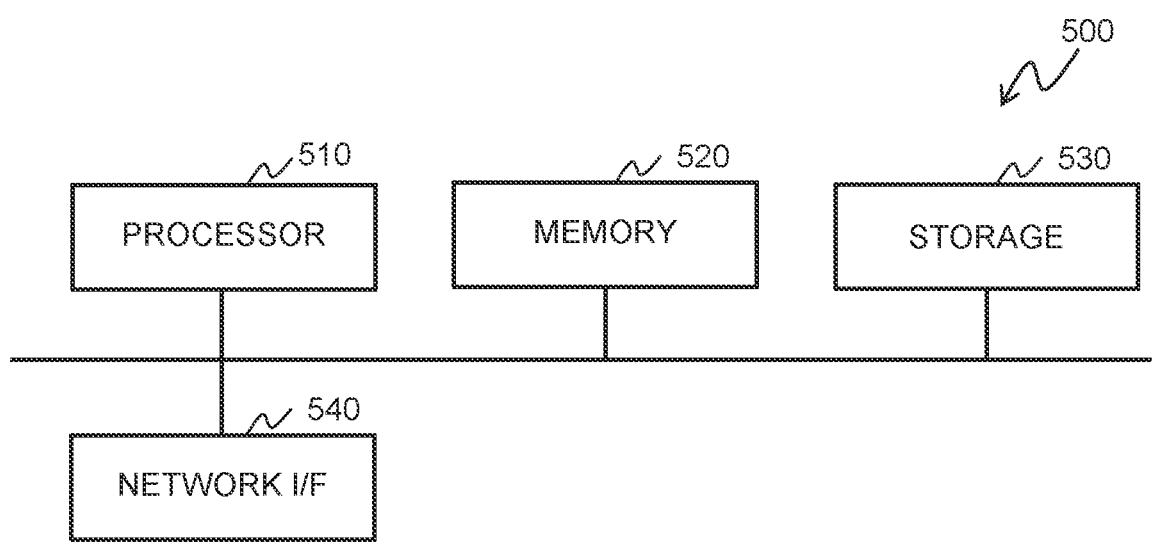
FIG. 13 is a diagram showing hardware of a computer.

FIG. 13 is a diagram showing hardware of the computer 500 which realizes the storage controller 3 or the interface unit 25. In the computer 500, one or more CPUs and a processor 510 such as an FPGA, a memory 520 such as a RAM (Random Access Memory), a storage 530 such as an SSD (Solid State Drive) or an HDD (Hard Disk Drive), and a network I/F (Inter/Face) 540 are connected via a bus.

In the computer 500, the storage controller 3 is realized by the programs for realizing the storage controller 3 being read from the storage 530 and executed based on the coordination of the processor 510 and the memory 520. Otherwise, the programs for realizing the storage controller 3 may also be acquired from an external computer comprising a non-temporary storage device through communication via the network I/F 540. Otherwise, the programs for realizing the storage controller 3 may be acquired by being recorded in a non-temporary storage medium and read by a medium-reading device.

Moreover, the interface unit 25 is realized by the processor 510 such as an FPGA being configured as a result of the programs for realizing the interface unit 25 being read from the storage 530. Similar to the programs for realizing the storage controller 3, the programs for realizing the interface unit 25 may also be acquired from an external computer comprising a non-temporary storage device through communication via the network I/F 540, or acquired by being recorded in a non-temporary storage medium and read by a medium-reading device.

Although the present disclosure has been described with reference to example embodiments, those skilled in the art will recognize that various changes and modifications may be made in form and detail without departing from the spirit and scope of the claimed subject matter. For example, the foregoing embodiments were explained in detail for explaining the present invention in an easy-to-understand manner, and the present invention is not necessarily limited to a type which comprises all of the configurations explained in the embodiments. Moreover, a part of the configuration of a certain embodiment may be replaced with the configuration of another embodiment, and the configuration of another embodiment may be added to the configuration of one embodiment. Furthermore, a part of the configuration of each embodiment may undergo addition, deletion, replacement, integration or distribution of another configuration. Moreover, the configuration and processing described in the embodiments described above may undergo distribution, integration or replacement as needed in light of processing efficiency or mounting efficiency.

What is claimed is:

1. A storage system including a plurality of storage controllers, wherein each storage controller comprises:

a first storage unit which stores data;

an interface unit which functions as an interface when communicating with another storage controller; and a processing unit which sends, to the interface unit, a parameter which instructs n-fold write of writing the data in each of n-number of (n is a natural number of 2 or more) the other storage controllers, the interface unit comprises a second storage unit, and n-number of queues, and;

when the interface unit receives the parameter, the interface unit executes each of the processes of:

acquiring the data from the first storage unit and storing the data in the second storage unit;

generating n-number of requests of writing the data in said each of n-number of the other storage controllers;

storing each of the generated requests in n-number of the queues corresponding to said each of n-number of the other storage controllers; and processing each request stored in each queue and transferring the data stored in the second storage unit to said each of n-number of the other storage controllers.

2. The storage system according to claim 1, wherein when the parameter received by the interface unit instructs n-fold write of the data stored in the first storage unit of its own storage controller, the interface unit executes each of the processes; and when the parameter received by the interface unit instructs n-fold write of the data stored in the first storage unit of another storage controller, the interface unit transfers the parameter to the another storage controller.

3. The storage system according to claim 1, wherein the interface unit asynchronously processes each request stored in each queue, and transfers the data stored in the second storage unit to said each of n-number of the other storage controllers; and the interface unit manages a status of data transfer related to each request in units of the data stored in the second storage unit.

4. The storage system according to claim 3, wherein when the interface unit completes data transfer related to all requests in units of the data stored in the second storage unit, the interface unit notifies of a data transfer completion to the processing unit of a transmission source of the parameter.

5. The storage system according to claim 4, wherein the interface unit notifies, together with the data transfer completion, success/failure of data transfer related to each request and, in a case of data transfer failure, a failure factor to the processing unit.

6. The storage system according to claim 3, wherein when the interface unit completes data transfer related to all requests in units of the data stored in the second storage unit, the interface unit erases the data stored in the second storage unit.

7. The storage system according to claim 1, wherein when the second storage unit does not have any free space for storing the data stored in the first storage unit, the interface unit acquires the data from the first storage unit for each data transfer to said n-number of the other storage controllers.

8. The storage system according to claim 1, wherein the interface unit further executes each of the processes of:
when a size of the data is greater than a free space of the second storage unit upon acquiring the data stored in the first storage unit and storing the data in the second storage unit, storing partitioned data, which is obtained by partitioning the data into a size that can be stored in the second storage unit, in the second storage unit;
generating n-number of partition requests of writing the partitioned data in said each of n-number of the other storage controllers;
storing each of the generated partition requests in n-number of the queues corresponding to said each of n-number of the other storage controllers; and
processing each partition request stored in each queue and transferring the partitioned data stored in the second storage unit to said each of n-number of the other storage controllers, for all of the partitioned data.

9. A data write control method in a storage system configured by including a plurality of storage controllers, wherein
each storage controller comprises:
a first storage unit which stores data;
an interface unit which functions as an interface when communicating with another storage controller; and
a processing unit, and
the interface unit comprises a second storage unit, and n-number of queues;
the method comprising the steps of:
sending, by the processing unit, to the interface unit, a parameter which instructs n-fold write of writing the data in each of n-number of (n is a natural number of 2 or more) the other storage controllers; and
when the interface unit receives the parameter, executing, by the interface unit, each of processes of:
acquiring the data from the first storage unit and storing the data in the second storage unit;
generating n-number of requests of writing the data in said each of n-number of the other storage controllers;
storing each of the generated requests in n-number of the queues corresponding to said each of n-number of the other storage controllers; and
processing each request stored in each queue and transferring the data stored in the second storage unit to said each of n-number of the other storage controllers.

10. A non-transitory computer readable medium for storing a data write control program for causing a processor to execute a process as an interface unit in a storage system including a plurality of storage controllers, each of which comprises a first storage unit which stores data, the interface unit which comprises a second storage unit and n-number of queues and functions as an interface when communicating with another storage controller, and a processing unit which sends, to the interface unit, a parameter which instructs n-fold write of writing, the data in each of n-number of (n is a natural number of 2 or more) the other storage controllers,
the process comprising:
when the interface unit receives the parameter,
acquiring the data from the first storage unit and storing the data in the second storage unit;
generating n-number of requests of writing the data in said each of n-number of the other storage controllers;
storing each of the generated requests in n-number of the queues corresponding to said each of n-number of the other storage controllers; and
processing each request stored in each queue and transferring the data stored in the second storage unit to said each of n-number of the other storage controllers.

* * * * *